Patented Oct. 2, 1934

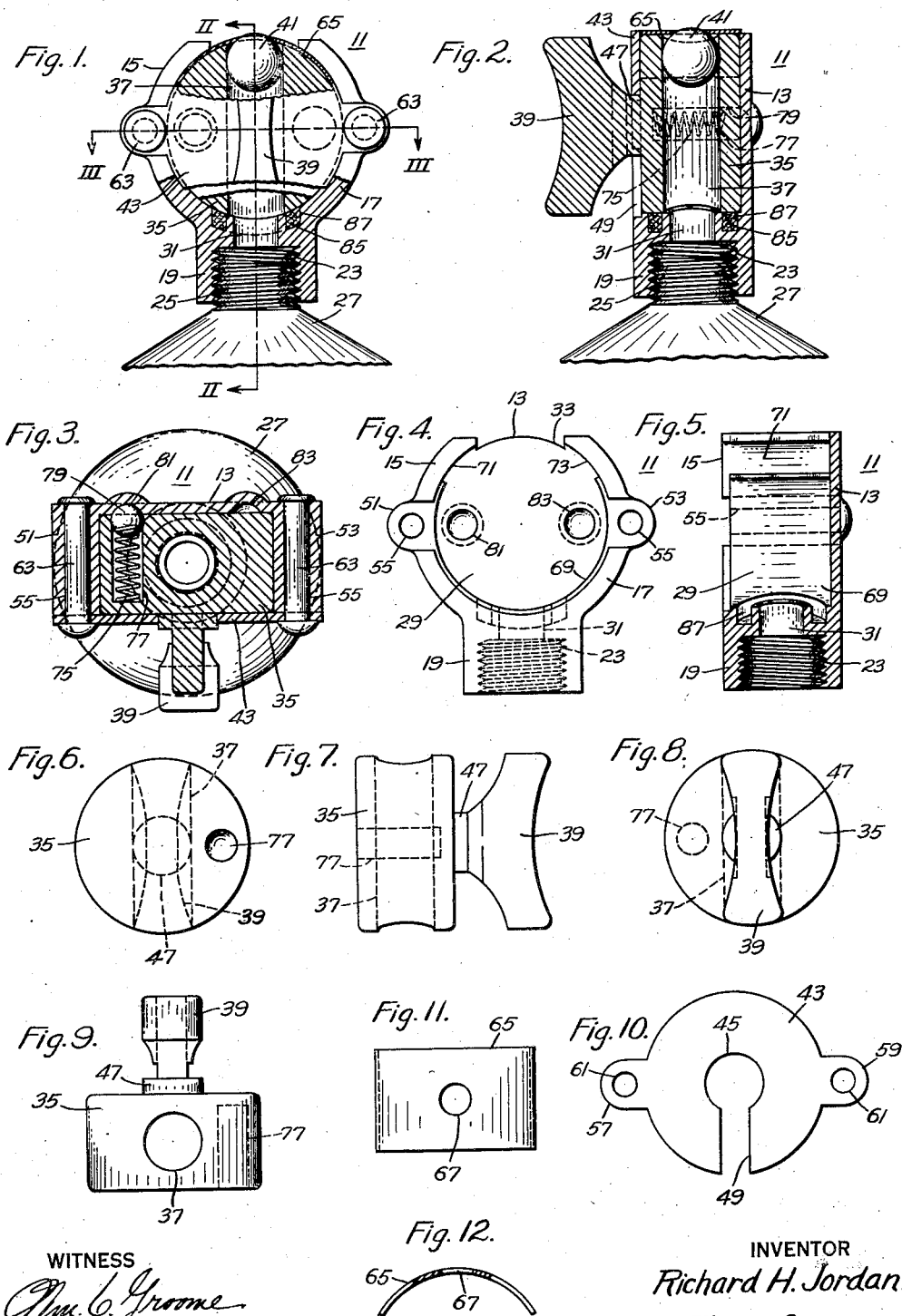

1,975,154

UNITED STATES PATENT OFFICE 1,975,154

DISPENSING DEVICE

Richard Hellmuth Jordan, Springfield, Mass.

Application January 9, 1934, Serial No. 705,871

5 Claims. (Cl. 221—102)

My invention relates to dispensing devices and particularly to measuring and dispensing devices for use with mobile material.

An object of my invention is to provide a relatively simple, compact and easily operated device attachable to different material containers to dispense therefrom in sequence measured quantities of material.

Another object of my invention is to provide a device that shall embody a minimum number of parts and easily and quickly attachable to collapsible tubes, such as those containing tooth paste or shaving cream.

Other objects of my invention will either be evident from the description to be given hereinafter of a preferred form of my device, or will be pointed out during the course of the description.

In practicing my invention, I provide a casing having means associated therewith for attaching it to a material container at an outlet opening therein, the casing having a small inlet opening and a larger outlet recess therein. I provide also a drum-like member turnable in the casing and having a passageway therethrough, with a spherical closure member slidable in the straight-walled passageway. The drum can be turned manually to bring the respective ends of the passageway into alinement with the inlet and the outlet openings in the casing. The outlet recess in the casing is closed by a resilient plate held in its proper operative position by the casing itself.

In the single sheet of drawing,

Figure 1 is a view, in front elevation, of a device embodying my invention shown as applied to a collapsible tube, certain portions of the device being cut away to show the details thereof.

Fig. 2 is a view in longitudinal section therethrough, taken on the line II—II of Fig. 1, Fig. 3 is a view in lateral section therethrough taken on the line III—III of Fig. 1, Fig. 4 is a view, in front elevation, of the casing constituting a part of the assembled device, Fig. 5 is a view in vertical section through the casing of Fig. 4, Fig. 6 is an end view of a rotatable drum, Fig. 7 is a view in side elevation of a rotatable drum, Fig. 8 is an end view of a rotatable drum as seen from the opposite end shown in Fig. 6, Fig. 9 is a top plan view of the rotatable drum showing the passageway therethrough, Fig. 10 is a view in front elevation of a cover plate for the casing, Fig. 11 is a top plan view of a resilient closure plate for the casing, and, Fig. 12 is a view in end elevation of the plate shown in Fig. 11.

The device embodying my invention includes more particularly a casing 11 having a rear wall 13 and two arcuate side portions 15 and 17 which unite at the bottom of the casing and merge into an extension 19, which extension may be provided with an internal screw-threaded opening 23. The size of the opening and the number of threads are made such as to fit on the screw-threaded end 25 of a material container 27, which material container may be assumed to be a collapsible tube containing tooth paste or shaving cream. The rear wall 13 and the two arcuate side portions 15 and 17 cooperate to provide an annular recess 29 for a purpose to be hereinafter explained in detail.

The internally screw-threaded opening 23 is reduced in diameter at its inner end portion to constitute an inlet opening 31 into the recess 29. It is to be noted that the upper ends of the arcuate portions 15 and 17 are spaced apart a relatively large peripheral distance to provide an outlet recess 33.

A rotatable drum member 35 is of such shape and dimensions as to diameter and thickness as to fit within the recess 29 and be rotatable or turnable therein. The outer diameter of the drum 35 is made a little less than the internal diameter of the greater portion of the recess or chamber 29 so that the drum 35 may easily turn in the casing but without any appreciable leakage of a mobile material which is to be dispensed by means of the device.

A passageway 37 having straight walls extends diametrally through the drum 35 and a handle 39 is associated with the drum 35 so that it may be turned in a manner to be described hereinafter. A closure member 41 preferably, but not necessarily, in the shape of a substantially spherical ball is reciprocally slidable in the passageway 37. For this purpose the external diameter of the ball 41 is made a very small amount less than the diameter of the passageway 37, so that while the ball will slide freely in the passageway, the mobile material to be dispensed by the use of the device will not be permitted to leak past the ball.

The position of the drum and its operating handle, when located in proper operative position in the casing is shown more particularly in Fig. 2 of the drawing from which it will be noted that the flat or rear end of the drum 35 is located against the inner surface of the rear wall 13. In order to hold the drum in its proper position in the casing I provide a removable front cover plate 43 which has a central opening 45 therein to surround the stem 47 of the handle 39 (see Fig. 7) and a radial slot 49 to permit of sliding the front cover over the front end of the drum and into its proper operative position against the front part of the casing. Means to hold the front cover plate 43 in its proper operative position are provided as follows:—The member 15 has a radial projection 51 integral therewith and member 17 has a similar radial projection 53 integral therewith, each of these projections provided with an opening 55 extending therethrough. The cover plate 43 is provided with two radial projections 57 and 59, each having an opening 61 therethrough, and as shown more particularly in Fig. 3 of the drawing, the front cover plate 43 may be held by a pair of rivets 63 having enlarged ends. Instead of using rivets extending through the cover and through the radial lugs 51 and 53, I may of course use short machine screws extending through the opening 61 and into screw threaded openings in the radial lugs 51 and 53.

As was hereinbefore stated the two arcuate members 15 and 17 are spaced relatively far apart at the outlet recess 33 and in order to close this outlet recess and provide a relatively small outlet opening, I provide an arcuate shaped plate 65, shown more particularly in Figs. 11 and 12 of the drawing, having an outlet opening 67 therethrough. Reference to Fig. 4 of the drawing will show that the inner peripheral wall 69 of the annular recess 29 is not continuous but stops short of the end portions of members 15 and 17. This construction provides a peripheral portion in each of the members 15 and 17 adjacent to their spaced ends which portions are numbered 71 and 73, respectively, for receiving the ends of the resilient metal member 65. In assembling the device the spring plate 65 is placed in its proper operative position in the outlet recess of the casing, after which the drum 35 with the closure member 41 therein is placed in the annular recess which will cooperate with the overhanging wall portions 71 and 73 to hold the plate 65 in the desired operative position. The front cover plate 43 is then located in its proper operative position and held therein by the rivets 63.

I desire here to point out that the diameter of the passageway 37 and the diameter of the closure member 41 are both greater than the diameter or area of the inlet opening 31 and particularly of the outlet opening 67 in the resilient plate 65, the latter being for a purpose to be hereinafter set forth.

I provide means in the casing and in the drum for holding the drum in its proper operative positions in the casing where the passageway 37 will be alined with the inlet opening 31 and the outlet opening 67. This means includes a spring 75 located in a lateral recess 77 in the drum 35, which spring presses a ball 79 outwardly into either one of two recesses 81 and 83 in the rear wall of the casing where the proper position of the drum in the casing has been effected. I thus provide cooperating resilient means in the rotatable drum and in the casing for not only indicating the proper operative positions of the drum in the casing but also for holding the drum in such operative positions.

As some pressure will be exerted upon the material in the container 27 and against the ball 41, I provide an annular resilient gasket 85, which may be made of cork or other suitable resilient material, to engage the peripheral surface of the drum 35 and which is located in an annular recess 87 surrounding the inlet opening 31.

The operation of the device embodying my invention is substantially as follows: Let it be assumed that the assembled casing as shown in Figs. 1 to 3 inclusive, has been operatively associated with a collapsible tube 27 or some other similar container having an outlet opening therein to effect removal of mobile material therein. Let it further be assumed that the ball 41 in the drum is adjacent to the inlet opening 31. If pressure is now exerted on the collapsible tube 27 in the usual manner the material located in that part of the tube adjacent to the outlet opening therein will be forced outwardly therethrough, into the inlet opening 31, moving the ball 41 outwardly through the passageway 37 until the ball has been moved into engagement with the spring plate 65, a small part of the ball fitting into the outlet opening 67 to fully close and seal the same. It is to be understood of course that the spring plate 65 is strong enough to resist ordinary extruding pressures on the collapsible tube or on the mobile material located therein.

If now the drum 35 be turned, in either one direction or the other, the ball 41 will first of all be forced slightly inwardly relatively to the drum 35, thereby breaking the seal because of the fact that that part thereof initially extending in to the opening 67 must move inside of the spring plate 65, and later on, within the peripheral wall 69. The hereinbefore described construction, embodying particularly a spherical closure member and an outlet opening of smaller size than the diameter of the closure member will, so to speak, break loose the closure member in case that the drum has not been turned for a relatively long time after the passageway was filled. The drum is turned until the ball 41 is again in the position where a part thereof will fit into the inlet opening 31.

To eject the material located in the passageway 37 on the outside of the ball 41, the operator needs only to provide the proper amount of pressure on either the material container or on the material therein, whereupon material in the container adjacent to the outlet opening therein will be forced outwardly, through the inlet opening 31 and against the ball 41, which will thereby be caused to move outwardly in the passageway 37, forcing the material already in the passageway outwardly through the outlet opening 67. It is to be noted that material is ejected through the outlet opening 67 for use by an operator, at the same time that the passageway is refilled with a substantially similar amount of fresh material.

The annular gasket 85, which may be made of cork or some other suitable material, will retain the mobile material within its inner periphery, thereby preventing waste of the material and also reducing the tendency to stick which might, otherwise be exhibited by the drum.

The device embodying my invention is particularly applicable to collapsible tubes and I have illustrated and described an embodiment of my invention as applied to such a tube. Its use is not however, limited thereto as it may be applied to containers for mobile material, such as grease, in which the container walls are rigid and in which pressure for moving the material is applied thereto in other ways.

The device embodying my invention provides a relatively simple measuring and dispensing device having relatively few parts and being therefore inexpensive to manufacture.

While I have shown the casing 11 as provided with an integral extension 19 having an opening therein provided with internal screw threads, I do not desire to be limited thereto as other means for attaching the casing to a material container are within the purview of my invention.

The use of a drum having a straight walled passageway therethrough makes possible the manufacture of the drum by relatively inexpensive methods such as die casting. The closure member, if of substantially spherical shape, is inexpensive and easily obtained. If it should be desired to reduce the amount of material dispensed by my device, the use of a cylindrical closure member with spherical ends will permit of obtaining such result.

Various modifications may be made in the device embodying my invention without departing from the spirit and scope thereof, and I desire therefore that only such limitations shall be placed thereon as are imposed by the prior art or are set forth in the appended claims.

I claim as my invention:—

1. A measuring and dispensing device comprising a casing having an inlet and an outlet opening, means to secure the casing to a material container with the inlet opening in the casing in communication with an outlet opening in the material container, a rotatable drum in the casing having a straight-walled passageway therethrough, a reciprocably-movable closure member having spherical ends located in the passageway and resiliently actuated means inside the casing for indicating the registration of the passageway with the inlet opening in the casing and in the material container.

2. A measuring and dispensing device for a material container having an outlet opening, said device comprising a casing having a relatively small inlet opening and a larger outlet recess therein, a drum rotatable in the casing and having a passageway therethrough, a closure member having spherical ends reciprocably slidable in the passageway and a resilient strip in the casing held in the outlet recess therein by the drum, said strip having an opening therethrough of lesser area than the passageway to serve as the outlet opening for material in the passageway, the resilient strip preventing the closure member moving out of the passageway in one direction.

3. A measuring and dispensing device attachable to a material container having an outlet opening, said device including a casing having an inlet and an outlet opening, means for securing the casing to a material container with the inlet opening of the casing in register with the outlet opening of the material container, a drum rotatable in the casing and having a passageway therethrough, a closure member for the passageway, reciprocably slidable therein, means on the drum to turn it to aline the pasageway with the inlet and outlet openings in the casing and cooperating means in the drum and the casing to hold the drum in said alined position.

4. A device as set forth in claim 3, in which the cooperating holding means comprises a recess in one member and a spring pressed ball in the other member.

5. A measuring and dispensing device attachable to a material container having an outlet opening, said device including a casing having an extension thereon with a relatively small inlet opening therethrough and adapted to register with the outlet opening in the material container, said casing having a larger outlet recess therein spaced from the inlet opening, a drum rotatable in the casing and having a straight walled passageway therethrough, means for turning the drum, a closure member having spherical ends reciprocably slidable in the passageway, a resilient strip in the casing held in the outlet recess therein by the drum, said strip having an opening therethrough of lesser area than the passageway in the drum to serve as the outlet opening for material in the passageway, the closure member being adapted to extend into the opening in the strip to seal the device and to move slightly inwardly into the passageway in the drum when the same is turned and cooperating resilient means in the drum and the casing to hold the drum in certain operative positions.

RICHARD HELLMUTH JORDAN.